United States Patent [19]

Canay

[11] Patent Number: 4,551,780
[45] Date of Patent: Nov. 5, 1985

[54] APPARATUS FOR REDUCING SUBSYNCHRONOUS FREQUENCIES IN A POWER SUPPLY

[75] Inventor: Muzaffer Canay, Birr, Switzerland

[73] Assignee: BBC Brown, Boveri & Company, Limited, Baden, Switzerland

[21] Appl. No.: 241,545

[22] Filed: Mar. 9, 1981

Related U.S. Application Data

[63] Continuation of Ser. No. 27,407, Apr. 5, 1979, abandoned.

[30] Foreign Application Priority Data

Jan. 10, 1979 [CH] Switzerland ............................ 212/79

[51] Int. Cl.[4] .............................................. H02H 7/06
[52] U.S. Cl. ...................................... 361/113; 361/20; 361/54; 363/39; 333/175; 333/176
[58] Field of Search ...................... 361/113, 20, 21, 54, 361/56, 58, 31, 33, 182, 184; 363/39, 40, 44, 47; 333/175, 176, 172, 173, 167, 181, 202, 12, 17 L; 322/58, 78, 32, 79; 307/129, 125, 126, 127, 128

[56] References Cited

U.S. PATENT DOCUMENTS

| | | | |
|---|---|---|---|
| 1,255,387 | 2/1918 | Chubb | 361/113 |
| 3,501,686 | 3/1970 | Tveteras et al. | 333/175 X |
| 3,555,291 | 1/1971 | Dewey | 333/176 X |
| 3,813,593 | 5/1974 | Tice et al. | 361/113 |
| 3,881,137 | 4/1975 | Thanawala | 361/113 |
| 3,944,846 | 3/1976 | Thompson et al. | 307/129 |

Primary Examiner—Patrick R. Salce
Attorney, Agent, or Firm—Burns, Doane, Swecker & Mathis

[57] ABSTRACT

A protective circuit for reducing subsynchronous natural resonant frequency signals in a multiphase power supply system includes a damping resistor connected in series with each phase winding of the system. A resonant circuit tuned to the rated line frequency of the system is connected in parallel with each resistor so that signals having frequencies other than the rated line frequency will be damped by the resistors. An inductor can also be placed in parallel with each resistor to maximize the damping effect of each resistor at predetermined subsynchronous frequencies.

9 Claims, 7 Drawing Figures

APPARATUS FOR REDUCING SUBSYNCHRONOUS FREQUENCIES IN A POWER SUPPLY

This is a continuation of application Ser. No. 27,407, filed Apr. 5, 1979, now abandoned.

BACKGROUND OF THE INVENTION

The present invention relates to a safety device for power supply systems utilizing synchronous machines, and more particularly to a protection circuit for damping the subsynchronous natural resonant frequency signals which can be damaging to a shaft connecting a turbine to a generator in a turbine generator power supply system.

The stability of a synchronous generator can be greatly reduced or possibly even eliminated when the inductive reactance between the generator and a high-voltage power line reaches high levels due to very long transmission lines. In order to overcome this problem, it is a common practice, particularly in the United States, to compensate for the large reactance of the long lines by as much as 60 to 80% through the use of capacitors connected in series with the transmission lines. Such a compensated system is shown in simplified configuration in the schematic circuit diagram of FIG. 1 in which a generator is connected to a network by a single transmission line. The reactances $x_G$ of the generator G, $x_T$ of the block transformer T, $-x_C$ of the series connected compensation capacitor C and $x_L$ of the transmission line L of the power transmission network N are generally greater than the resistances $r_G$, $r_T$, and $r_L$ of generator G, block transformer T and network N, respectively, and therefore play a major factor in determining the output current value. By way of example, the numerical values of the reactances for the components illustrated in FIG. 1 can be $x_G=0.145$, $x_T=0.14$, $x_C=0.371$ and $x_L=0.53$ at a rated line frequency of 60 Hz.

The total inductive reactance $\Sigma_x$ between the generator G and the power supply network N increases linearly with the frequency $\omega$ of the current in the system, as illustrated in FIG. 2a by curve 1. The capacitor C connected in series with the transmission line acts as a negative reactance which is inversely proportional to the frequency $\omega$, i.e. as the frequency increases, the absolute value of the reactance decreases as shown at curve 2 in FIG. 2a. In FIG. 2b, the resulting reactance $\Sigma_x$ between the internal subtransient voltage of the generator and the power supply system voltage, namely $$(x_G + x_T + x_L) \cdot \frac{\omega}{\omega_n} - x_C \frac{\omega_n}{\omega}$$

is plotted as a function of $\omega$, wherein $\omega_n$ is the rated line frequency of the power supply system, e.g. 60 Hz. The electrical resonant frequency $\omega_e$ of the system is defined as:

$$\omega_e = \omega_n \cdot \sqrt{\frac{x_C}{x_G + x_T + x_L}}$$

and the total reactance of the circuit is zero at this frequency.

During certain dynamic processes, such as load decreases or automatic reclosing of short-circuiting safety devices such as a circuit breaker S or a spark-over device to add additional capacitance (as illustrated in FIG. 1), the capacitive reactance of the supply system will be varied such that resonant currents at the electrical resonance frequency $\omega_e$ will be produced if the initial conditions of the system are proper. In conjunction with the rated frequency $\omega_n$ of the supply system, these currents will generate electrical air-gap torques which pulse at the differential frequency $$\omega_n - \omega_e.$$

If this pulsing torque frequency coincides with one of the natural mechanical frequencies $\omega_m$ of the shaft connecting the turbine to the generator, i.e.

$$\omega_m = \omega_n - \omega_e,$$

an electromechanical resonance will occur. The mechanical torque in the shaft can increase to inadmissibly high values. Furthermore, since a synchronous machine running at a rated speed but generating current having a frequency less than the rated frequency $\omega_n$ acts as an asynchronous generator, it is entirely possible that the electromechanical resonance from the generator will be reinforced by the asynchronous output signal. In such a case, the mechanical torque in the shaft can increase to such a point that the shaft will rupture.

In the past, it has been known to protect a turbine generator from subsynchronous resonance by means of a filter such as that shown in FIG. 3a, in which those currents having frequencies which cause a subsynchronous resonance in the shaft are screened out. This screening filter is usually short-circuited during normal operation of the supply system, and is connected in series with the power supply circuit by means of a control member when a subsynchronous resonance is detected. When the filter is switched into the circuit, the response of the resulting circuit reactance to the frequency of the current is modified. The reactance of the circuit when the filter is switched in is illustrated in solid lines in FIG. 3b and contrasted with the reactance existing prior to connection of the filter, which is illustrated by the dashed line. It can be seen that the filter is designed so that the reactance of the network is infinitely great in the vicinity of the mechanical natural frequency $\omega_n - \omega_m$ when the filter is switched into the circuit. It is equal to zero, however, for the frequencies $\omega_1$ and $\omega_2$. Thus, only currents at the frequencies $\omega_1$ and $\omega_2$ can appear during the dynamic process in which the filter is connected to the power supply circuit. Since no current will flow at the electromechanical resonance frequency $\omega_n - \omega_m$, no mechanical torque will appear at the mechanical natural frequency $\omega_m$ of the shaft. Accordingly, a subsynchronous resonance is prevented.

Filters of this type can be installed at the neutral point of the generator or the block transformer, for example. Further details of such a system are described in U.S. Pat. No. 3,813,593 and in Volume 37 of *Proceedings of the American Power Conference*, 1975, at pp. 916–922.

The shaft of a turbine generator can have a number of natural frequencies. For this reason, the filter must be designed for a number of frequencies $\omega_{m(1)}$, $\omega_{m(2)}$, . . . . As the number of natural frequencies increases, the cost of the filter and the difficulty of precise adjustment of the filter will be correspondingly increased.

The connection of one or more filters which are synchronized to the natural mechanical frequencies $\omega_m$ of the shaft presents a number of other disadvantages. The natural frequencies $\omega_m$ of the shaft can be determined only within certain tolerances. Therefore, the adjustment of the filter to tune it to these frequencies can be difficult and provide less than satisfactory results. In addition, the response characteristics of the filter are dependent upon temperature and therefore vary under differing conditions.

In many cases, the resistance of the transmission lines is so small that currents at the frequencies $\omega_1$, $\omega_2$, (previously defined with respect to FIG. 3b) are not adequately damped. These currents and the electrical exciting torques which accompany them can increase to a large degree in cases in which signals at the frequencies $\omega_n - \omega_1$ and $\omega_n - \omega_2$ are present in the supply system. The mechanical torques which are consequently induced in the shaft can likewise achieve high values in spite of the filters.

Furthermore, the short circuiting of the filter to remove it from the circuit after completion of a dynamic event presents an uneven transition in the total system reactance. Under certain circumstances, this transition can cause another transient phenomenon which will require the filter to be connected to the circuit again, making it difficult to achieve a steady-state condition.

Another proposed solution for damping the subsynchronous resonances consists of placing a resistor in shunt with one or more of the compensation capacitors between the block transformer and the network. In the event that energy losses in the shunt resistance become too great, the power frequency current is diverted away from the shunt resistance by means of a relatively simple resonant circuit. Such a solution using a shunt resistor is described in the article appearing in *IEEE Transactions* PAS-90, Vol. 3, 1971, pp. 1305–1311, and more particularly at page 1309 in the lefthand column. This proposed solution presents undesired interventions in the transmission network and accompanying power losses. Furthermore, it is expensive due to the cost of damping circuits which are rated for the high-voltage of the power supply system.

OBJECTS AND BRIEF SUMMARY OF THE INVENTION

It is therefore an object of the present invention to provide a novel safety device for protecting against subsynchronous resonances which overcomes the prevously discussed disadvantages of the prior art protection arrangements.

It is a further object of the present invention to provide a novel safety device which is economical in construction and possesses high operational reliability.

It is another object of the present invention to provide a novel protection circuit having a filter which need only be tuned to the known rated frequency of the power supply system.

It is yet a further object of the present invention to provide a novel protection circuit which will dampen out subsynchronous frequency signals without having any effect upon the rated signal.

These as well as other objects and advantages are achieved in accordance with the present invention by providing a safety device in which at least one damping resistance is connected in series with each phase winding of the turbine generator. Furthermore, a series-resonant circuit is connected in parallel with each damping resistance and adjusted to the rated frequency of the supply system to render the damping resistances frequency responsive. The damping resistances are connected to the windings at the neutral point of the block transformer or of the generator of the turbine generator system.

In accordance with the present invention, individual unfavorable frequencies are not screened out with a filter tuned to those particular frequencies. Rather, the damping arrangement is effective to damp out only those signals having frequencies outside of the rated line frequency by considerably increasing the resistance of the circuit in the unfavorable frequency range. Inductive and capacitive reactances in the series-resonant circuit connected to the damping resistance are equal and cancel each other out at the rated frequency. Therefore, during normal operation of the power supply circuit, the voltage drop is zero in the resonant circuit so that no current flows through the damping resistance. However, for frequencies outside the rated line frequency, a voltage drop appears across the resonant circuit and the damping resistance automatically becomes effective to dampen signals at the unwanted frequencies.

To reinforce the effect of the damping arrangement at low mechanical natural frequencies of the shaft, in accordance with a further feature of the present invention, an inductance can be connected in parallel with the damping resistance. In accordance with another feature of the present invention, the damping resistance can be increased by means of a series connection of a number of individual resistances which are each connected in parallel to a series-resonant circuit tuned to the rated line frequency. Alternatively, a predetermined resistance value can be obtained by dividing the damping resistance into a number of smaller resistances.

According to a further feature of the present invention, the damping circuit consisting of the damping resistance and series-resonant circuit, as well as any additional parallel inductance, can be connected in parallel with a bridging switch. A frequency responsive relay can open the switch when the occurrence of frequencies outside of the line frequencies is detected. The switch can be closed again after the disturbing frequency has been damped out.

BRIEF DESCRIPTION OF THE DRAWINGS

Referring to FIG. 4, a turbine generator has a turbine 1 which drives a three-phase synchronous generator G through a shaft 2. The three-phase synchronous generator supplies a three-phase network N with power through a three-phase block transformer T. The block transformer T contains a delta connected primary winding 3 and a star connected secondary winding 4 having three winding branches 5, 6 and 7. Each winding branch features a high-voltage connection terminal 8 and a low-voltage connection terminal 9. The high-voltage connection terminals 8 of winding branches 5, 6 and 7 are respectively connected to corresponding transmission lines 10, 11 and 12 of the three-phase power supply network N.

Figure 4:
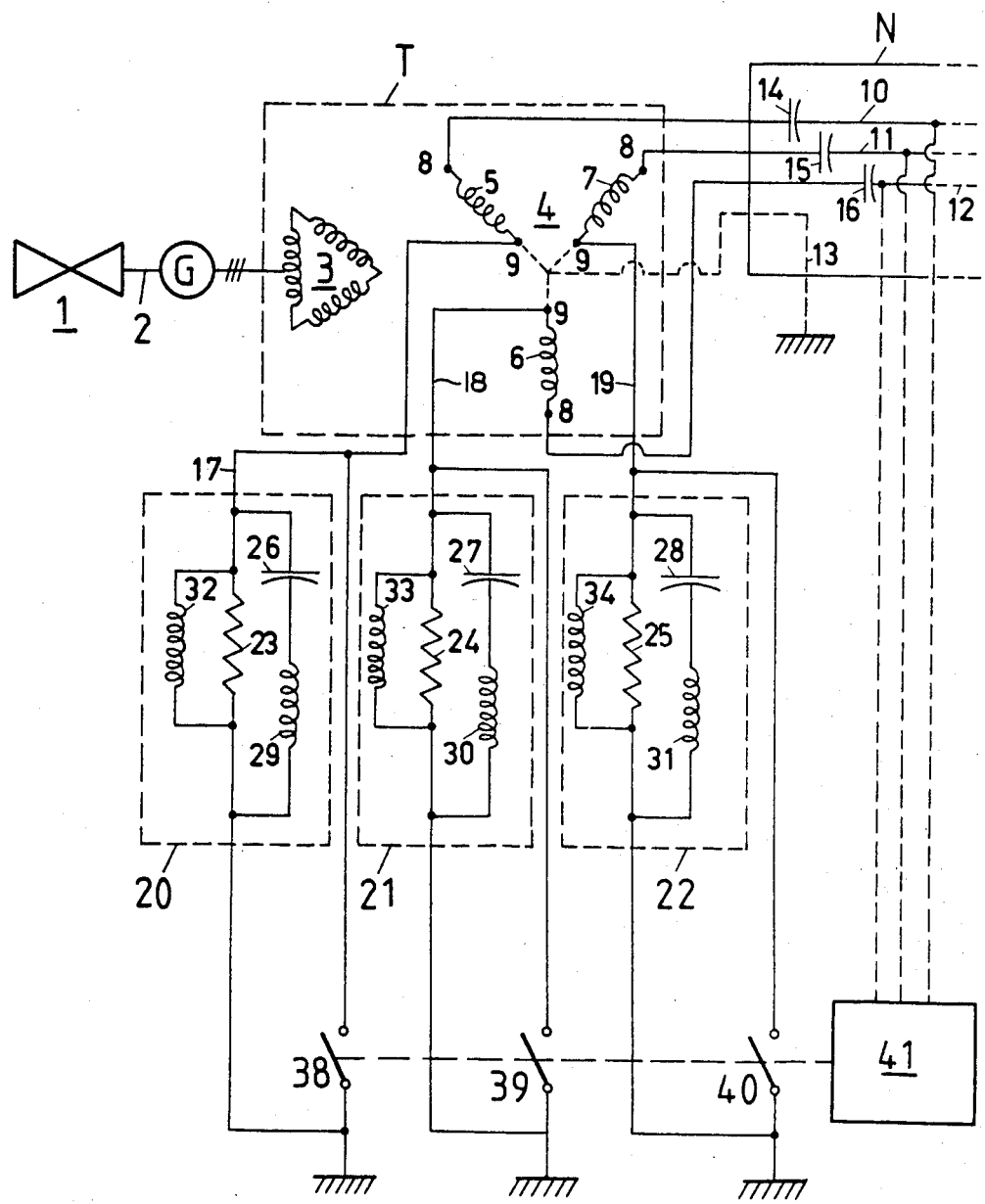
FIG. 4 is a schematic circuit diagram of one embodiment of a safety device according to the present invention in which the damping arrangement is installed at the neutral point of the block transformer.

Conventionally, the low-voltage connection terminals 9 of the winding branches are connected to one another and with a ground connection 13 of the three-phase network 10, as shown by the dashed connecting lines in FIG. 4. Compensation capacitors 14, 15 and 16 are connected in series with the transmission lines 10 11 and 12 for compensation of the inductive reactance of the network N.

In accordance with the present invention, the low-voltage connection terminals 9 of the respective winding branches 5, 6 and 7 in the block transformer T are separated from one another and damping circuits 20, 21 and 22 are connected between the ground terminal and the low-voltage connection terminals 9 of the winding branches 5 6 and 7 through connecting lines 17, 18 and 19. These damping circuits each contain a damping resistor 23, 24, 25 connected between the low-voltage connection terminal 9 and ground, and a series-resonant circuit connected in parallel with the resistor. Each series resonant circuit contains a capacitor 26, 27, 28 and an inductor 29, 30, 31 connected in series. In addition, an inductor 32, 33, 34 can be connected in parallel with each one of the damping resistors 23, 24, 25. The series-resonant circuits 20, 21, 22 are tuned to the rated line frequency $\omega_n$ so that the inductive and capacitive reactances of the circuits are equal at the rated frequency and cancel each other out to provide no voltage drop between the low voltage connection terminals and ground at the rated frequency. The inductance of each of the additional parallel inductors 32, 33, 34 can be chosen in accordance with the lowest mechanical natural frequencies of the shafts to provide the greatest impedance at these frequencies, and the damping effect of the damping resistors 23, 24, 25 will be maximized at these frequencies.

Figure 5:
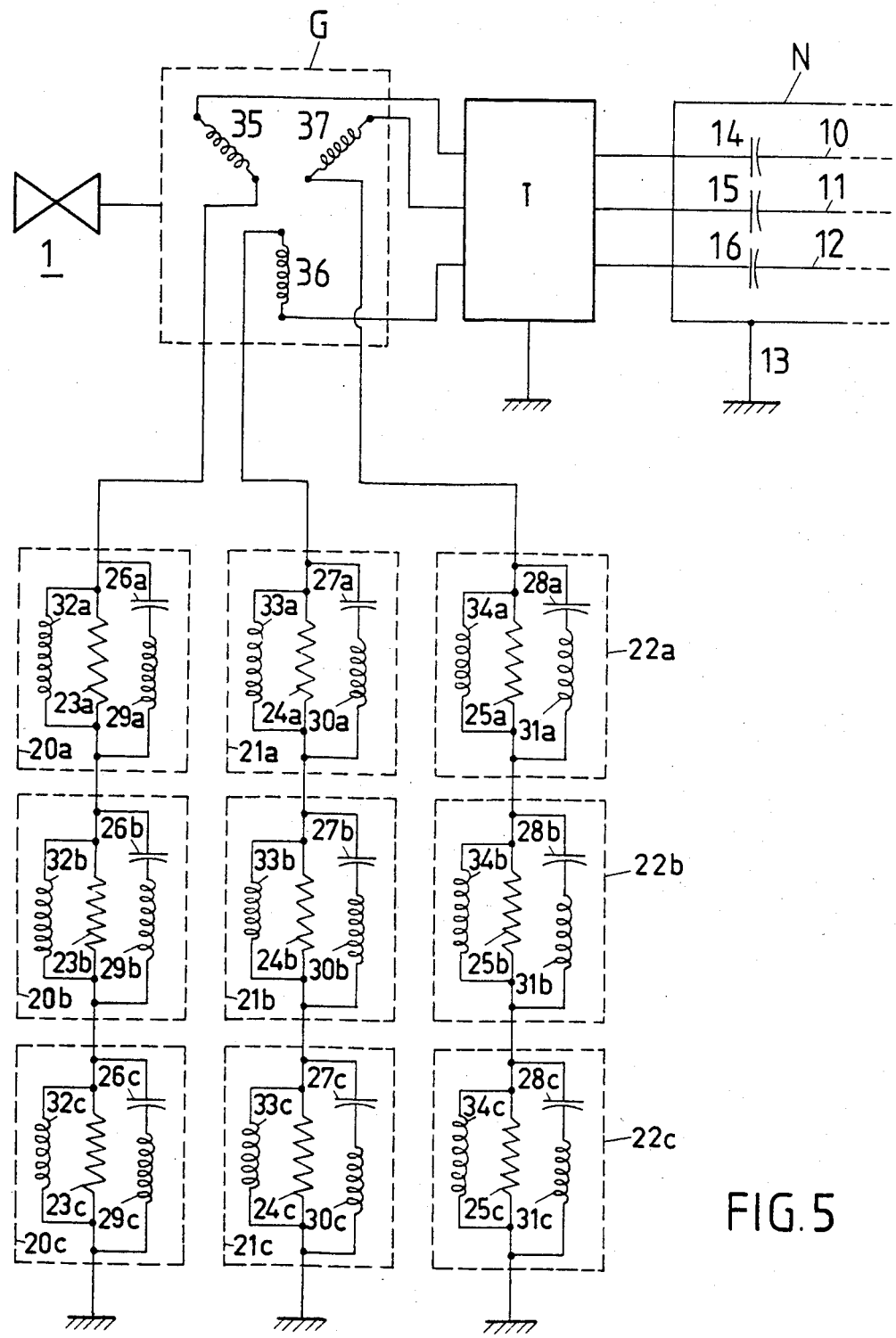
FIG. 5 is a schematic circuit diagram of a second embodiment of the present invention in which the damping arrangement is installed at the neutral point of the generator.

An alternative embodiment of a safety device for protection against subsynchronous resonances is illustrated in FIG. 5 in which the damping circuit is connected to the neutral terminals of the generator G rather than the neutral terminals of the block transformer T as shown in FIG. 4. The three-phase generator G has three star connected stator windings 35, 36, 37 which are rotated by a turbine 1 through a shaft 2. The generator G supplies the three-phase power supply network N with power through a block transformer T as described previously in connection with FIG. 4. The three secondary winding branches of the block transformer T can be connected with each other at their low-voltage connection terminals and to a ground terminal 13 of the three-phase network N.

The damping circuits 20', 21' and 22' are respectively connected in series with the stator windings 35, 36 and 37 of the generator G. These damping circuits can be constructed in the same manner as those shown in FIG. 4. Alternatively, each of the damping circuits can include three partial resistors 23a, 23b, 23c; 24a, 24b, 24c or 25a, 25b, 25c connected in series. A series-resonant circuit tuned to the rated line frequency $\omega_n$ is connected in parallel with each partial resistor. Each series-resonant circuit consists of the series connection of a capacitor 26a, 26b, 26c; 27a, 27b, or 28a, 28b, 28c and an inductor 29a, 29b, 29c; 30a, 30b, 30c or 31a, 31b, 31c. An additional inductor 32a, 32b, 32c; 33a, 33b, 33c or 34a, 34b, 34c can also be connected in parallel with each of the partial resistors as described previously.

If desired, the damping circuits 20, 21 and 22 or 20', 21' and 22' can be short circuited during normal operation of the power supply network by shunting switches 38, 39 and 40, as shown in FIG. 4. When a subsynchronous frequency appears in the network, the switches can be opened by means of a frequency responsive relay 41. The frequency responsive relay 41 can include a frequency discriminator which delivers an output signal when the input signal from the network includes components which are outside of the rated network frequency, for example.

The operation of the safety devices illustrated in FIGS. 4 and 5 will now be explained in detail with reference to the graphs shown in FIGS. 6 and 7.

As is well known in the art, a generator running at rated speed will provide a negative resistance and accordingly act as a current source for output currents which are less than the rated frequency, i.e. $\omega < \omega_n$. When the resulting resistance provided by the damping circuit of the safety device is greater than the negative resistance of the generator, an effective damping of the subsynchronous frequencies will be provided even when the transmission lines have no appreciable resistance.

During normal operation, i.e. when the output current of the generator is at the rated frequency $\omega_n$, the voltage drop between the low-voltage connection terminals 9 and ground is zero because the series resonant circuits present no impedance and therefore no current flows through the damping resistors 23, 24, 25. However, for frequencies other than $\omega = \omega_n$, the voltage between the low-voltage connections 9 and the ground is no longer zero due to the impedance characteristics of the series resonant circuits. For these frequencies, the damping resistors 23, 24, 25 are no longer short circuited by the resonant circuits and they automatically become effective to dampen the unwanted signals. After completion of the dynamic process in which the subsynchronous frequencies are damped, the voltage between the low-voltage connection terminals 9 and the ground returns to zero as the output current returns to the rated frequency. It can be seen that this automatic insertion and removal of the damping resistance from the supply circuit for protection of the shaft against subsynchronous resonances is a continuous process which brings about smooth transitions and causes no instabilities in the operation of the supply circuit. These same considerations are valid where the damping circuits are connected to the neutral point of the generator as illustrated in FIG. 5.

Figure 6:
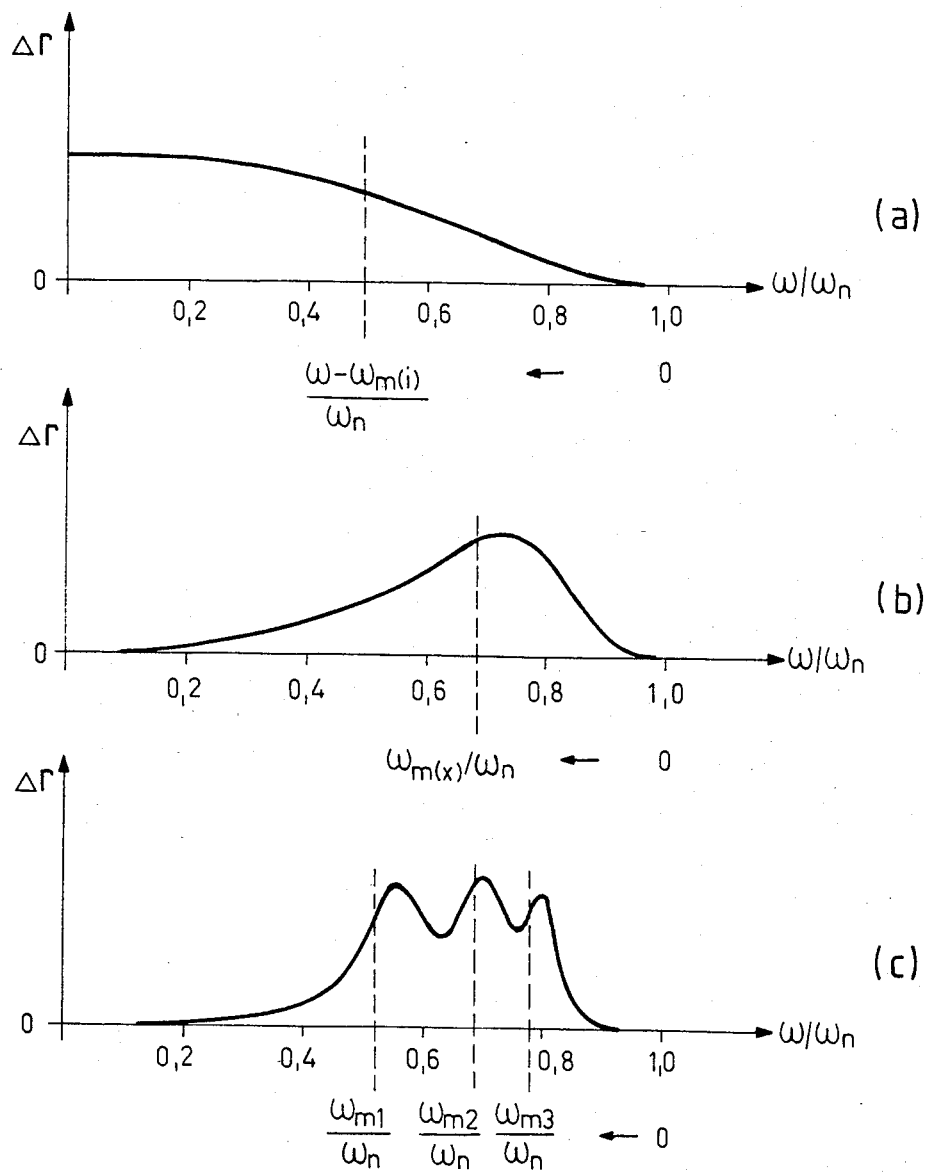
FIGS. 6a, b and c are graphs illustrating the effect of various embodiments of the damping arrangements of the present invention on the resistance of the system.

The additional damping resistance, $\Delta r$, which is obtained with the damping circuit of the present invention, is plotted in FIG. 6 as a function of the standardized frequency $\omega/\omega_n$. In FIG. 6a, the damping arrangement for the circuit illustrated in FIG. 4 without the additional parallel inductors 32, 33 and 34 is illustrated. It can be seen that the damping arrangement of the present invention provides no resistance at the rated line frequency $\omega_n$, but offers increasing resistance and consequent damping of the signal as the output frequency deviates from the rated frequency. FIG. 6b illustrates the effect of the additional inductance on the damping resistance wherein the damping effect of the resistance is maximized at the particular subsynchronous frequency $\omega_m$ for which the inductance value of the additional inductor is chosen. FIG. 6c illustrates the operation of the damping circuits of FIG. 5 in which each branch contains three partial resistors and three additional inductors tuned to different subsynchronous frequencies $\omega_{m1}, \omega_{m2}$ and $\omega_{m3}$. As can be clearly seen from these three diagrams, it is possible to achieve sufficient signal damping for a desired frequency range. The current components having frequencies not equal to the rated frequency $\omega_n$ will decay quite rapidly due to the operation of the damping resistances. Both the exciting electrical torque as well as the mechanical torques in the shaft will be considerably reduced.

Figure 7:
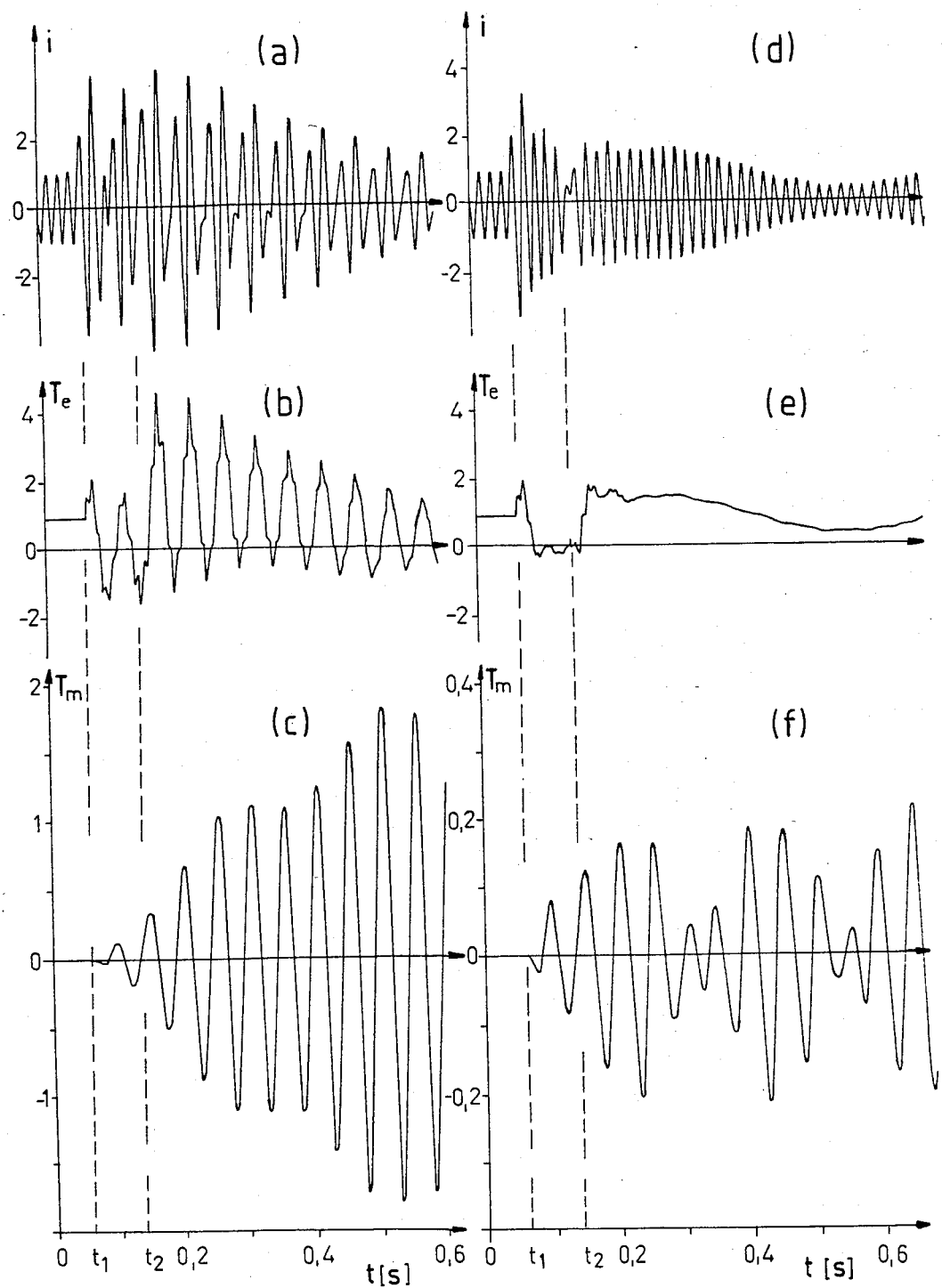
FIGS. 7a–7f are graphs illustrating the effect of the damping arrangement on the stator current, electrical torque and mechanical torque in the shaft of the exciter in contrast with a supply system not having such a safety device.

The graphs of FIG. 7 compare the effects of a safety device constructed according to the present invention with a system not having such a safety device, with reference to the stator current i of the generator G, the electrical torque $T_e$ and the mechanical torque $T_m$ in the shaft of the exciter of the generator G. The measurements were performed in conjunction with a circuit constructed such as that illustrated in FIG. 4. By way of example, the numerical values of the inductive reactance of the system can be 0.3, the capacitive reactance of the resonance circuit can be 0.3, and the damping resistance can be 0.2. The inductive reactance of the additional inductor connected in parallel with the damping resistance can be 0.25.

Figure 1:
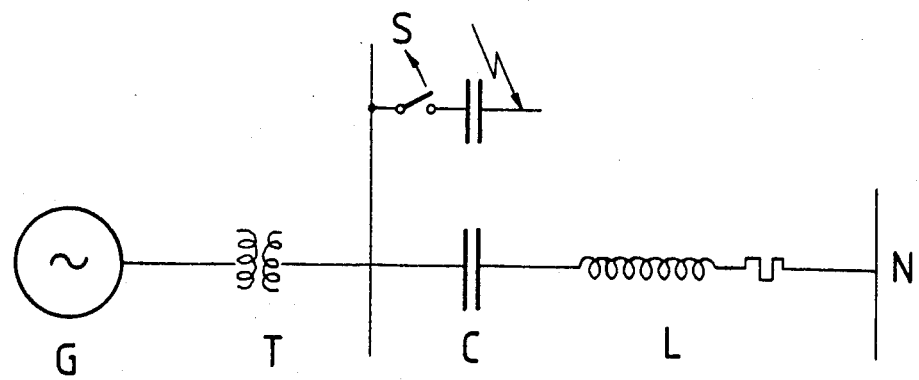
FIG. 1 is a simplified schematic circuit diagram of a power supply system for an explanation of the problem underlying the present invention.
Figure 2:
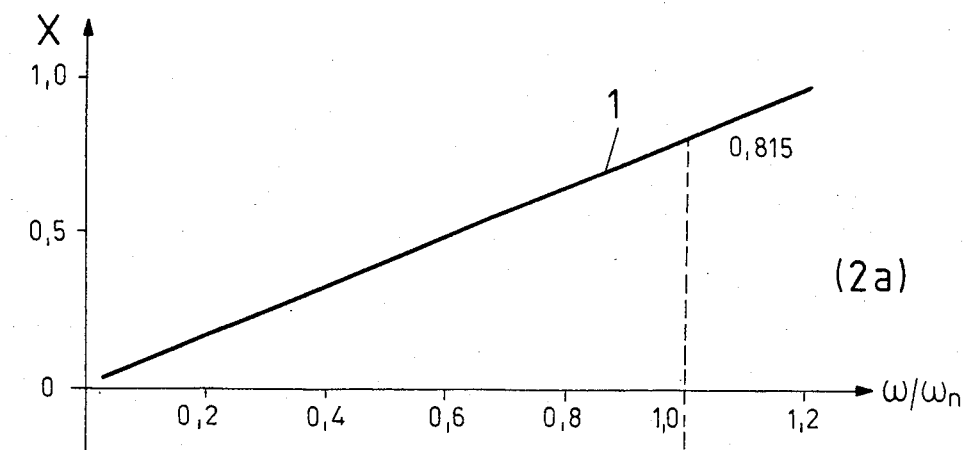
FIGS. 2a and 2b are graphs illustrating system reactance versus frequency.
Figure 2:
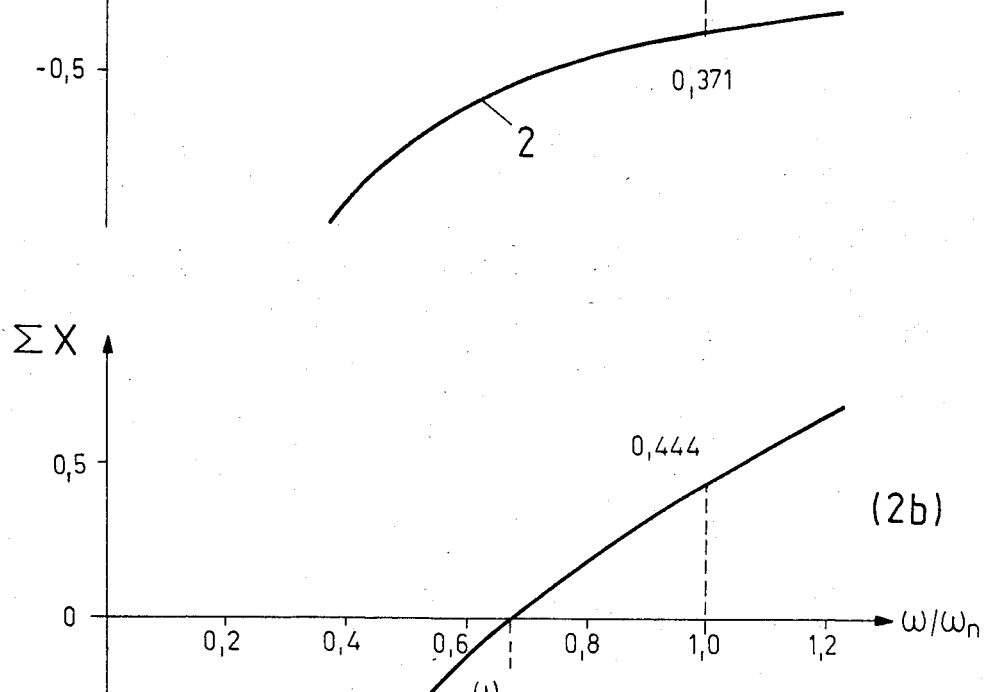
Figure 3:
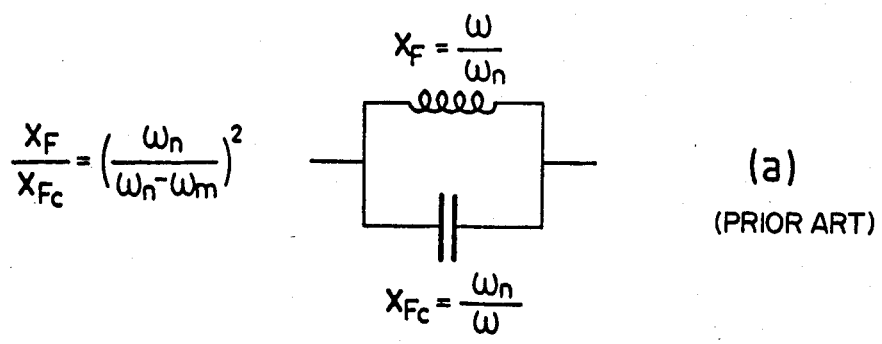
FIG. 3a is a schematic circuit diagram of a prior art protection filter and FIG. 3b is a graph illustrating the effect of such a filter on system reactance.
Figure 3:
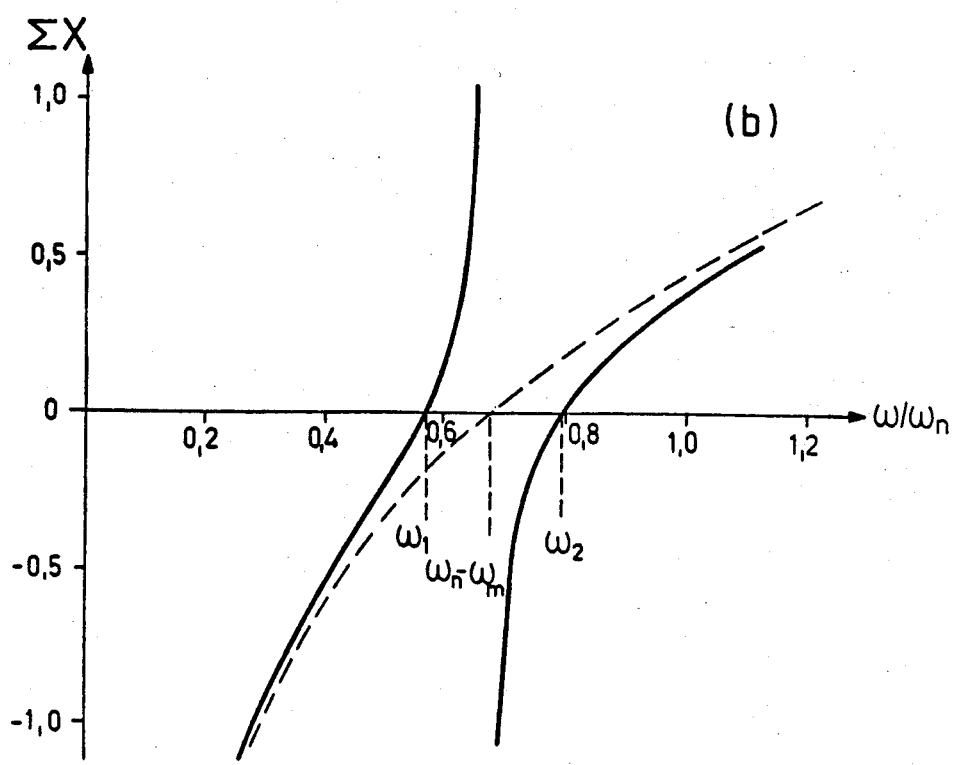

A three-phase fault at time $t_1$ in the high-voltage power supply network N will cause a network safety device, such as the circuit breaker S of FIG. 1, to be actuated to switch capacitors into the network circuit at time $t_2$. As a result of the combination of the reactance introduced by the capacitors 14, 15, 16 with that of the network, a subsynchronous resonance can be produced in the shaft of the generator exciter or the shaft connecting the generator to the turbine. For example, the subsynchronous frequency may be of a value such that $\omega_e/\omega_n = 0.675$, as shown in FIG. 2b. The mechanical torque in the shaft of the exciter can rapidly reach very high and inadmissible values, such as illustrated in FIG. 7c. The graphs in FIGS. 7d, 7e and 7f illustrate that the stator current, electrical torque and mechanical torque are significantly reduced when series damping is provided, such as by means of the circuit shown in FIG. 4 having the characteristic effective resistance illustrated in FIG. 6. The electrical torque is greatly reduced and the mechanical torque in the shaft of the generator exciter, as shown in FIG. 7f (wherein $T_m$ is shown magnified five times with respect to FIG. 7c), no longer exhibits any resonance phenomenon although the resonance frequencies remain approximately equal.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. In a power transmission system comprising a turbine-driven multiphase synchronous generator for supplying power signals at a predetermined rated frequency to a transmission line network by means of a multiphase block transformer, wherein at least one of said generator and said transformer includes a secondary winding having a plurality of phase windings, the high-voltage terminals of which are respectively connected to respective transmission lines of said network, and further including a line of shafts connecting the turbine to the generator that exhibit one or more natural frequencies lower than said rated frequency, a system for protecting said line of shafts from damage due to oscillations at said natural frequencies, comprising:
   a plurality of damping resistors directly and separately connecting the low voltage terminals of said phase windings to a neutral potential terminal; and
   a series resonant circuit tuned to said predetermined rated frequency connected in parallel with each of said damping resistors whereby said damping resistors have negligible effect on signals at said predetermined rated frequency and are effective to damp out signals at frequencies other than said predetermined rated frequency.

2. The power transmission system of claim 1 wherein said resistors are connected to the low voltage terminals of the phase winding of said block transformer.

3. The power transmission system of claim 1 wherein siad resistors are connected to the low voltage terminals of the phase windings of said generator.

4. The power transmission system of cliam 1 wherein said resonant circuit comprise a series connection of an inductor and a capacitor.

5. The power transmission system of claim 4 wherein the reactances of said capacitor and said inductor are equal at the predetermined rated frequency.

6. The power transmission system of claim 1 wherein each of said damping resistors comprises a plurality of serially connected partial resistors, each of said partial resistors having a resonant circuit connected in parallel therewith which is tuned to the predetermined rated frequency.

7. The power transmission system of claim 1 or 6 further including an inductor connected in parallel with each of said resistors, each inductor having an inductance value which is chosen in accordance with a subsynchronous natural resonant frequency of said line of shafts such that the damping capacity of the resistor associated with a respective inductor is maximized at the subsynchronous natural resonant frequency to which the inductor is tuned.

8. The power transmission system of claim 1 further including a shunt switch connected in parallel with each of said damping resistors for effectively removing the protective circuit from the power supply system.

9. The power transmission system of claim 8 further including means responsive to the frequencies of the signals in said transmission line network for controlling the actuation of said shunt switches.

* * * * *